US008442467B1

(12) United States Patent
Rausch et al.

(10) Patent No.: US 8,442,467 B1
(45) Date of Patent: May 14, 2013

(54) WIRELESS COMMUNICATION DEVICE WITH A MULTI-BAND ANTENNA

(75) Inventors: Walter F. Rausch, Shawnee, KS (US); Harry W. Perlow, Tarpon Springs, FL (US); Habib Riazi, Stafford, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 696 days.

(21) Appl. No.: 12/372,859

(22) Filed: Feb. 18, 2009

(51) Int. Cl.
*H04B 1/06* (2006.01)
*H04B 7/00* (2006.01)

(52) U.S. Cl.
USPC ............. 455/272; 343/700 MS; 343/702

(58) Field of Classification Search ........... 455/272; 343/700 MS, 702
See application file for complete search history.

(56) References Cited

U.S. PATENT DOCUMENTS

| | | | |
|---|---|---|---|
| 6,191,740 B1 | 2/2001 | Kates et al. | |
| 6,498,587 B1 | 12/2002 | Desclos et al. | |
| 6,650,294 B2 | 11/2003 | Ying et al. | |
| 7,031,689 B2* | 4/2006 | Frank | 455/333 |
| 7,123,209 B1* | 10/2006 | Desclos et al. | 343/860 |
| 7,260,424 B2 | 8/2007 | Schmidt | |
| 7,616,158 B2* | 11/2009 | Mak et al. | 343/700 MS |
| 7,741,998 B2* | 6/2010 | Thornell-Pers | 343/700 MS |
| 7,800,544 B2* | 9/2010 | Thornell-Pers | 343/702 |
| 2001/0016477 A1* | 8/2001 | Harano | 455/277.1 |
| 2003/0219035 A1 | 11/2003 | Schmidt | |
| 2004/0038660 A1* | 2/2004 | He et al. | 455/277.1 |
| 2004/0160371 A1* | 8/2004 | Hirota | 343/702 |
| 2005/0141634 A1* | 6/2005 | Lin | 375/295 |
| 2006/0211412 A1* | 9/2006 | Vance | 455/418 |
| 2006/0223456 A1* | 10/2006 | Ouzillou | 455/78 |
| 2006/0262015 A1* | 11/2006 | Thornell-Pers et al. | 343/702 |
| 2007/0225034 A1 | 9/2007 | Schmidt | |
| 2007/0275660 A1* | 11/2007 | Sathath | 455/13.4 |
| 2008/0100526 A1* | 5/2008 | Castaneda et al. | 343/859 |

FOREIGN PATENT DOCUMENTS

WO   WO 2005074070 A1 *  8/2005

\* cited by examiner

*Primary Examiner* — Quan Tra

(57) ABSTRACT

In a wireless communication device, circuitry selects a first frequency band for a first wireless communication and transfers a pair of radio frequency signals at the first frequency band. An antenna receives and orthogonally transmits the radio frequency signals over a first patch antenna element that is resonant at the first frequency band. The circuitry selects a second frequency band for a second wireless communication and transfers a pair of radio frequency signals at the second frequency band and including a voltage component. The antenna receives the radio frequency signals including the voltage component, couples a second patch antenna element to the first patch antenna element in response to the voltage component, and orthogonally transmits the radio frequency signals over the coupled patch antenna elements that together are resonant at the second frequency band.

19 Claims, 8 Drawing Sheets

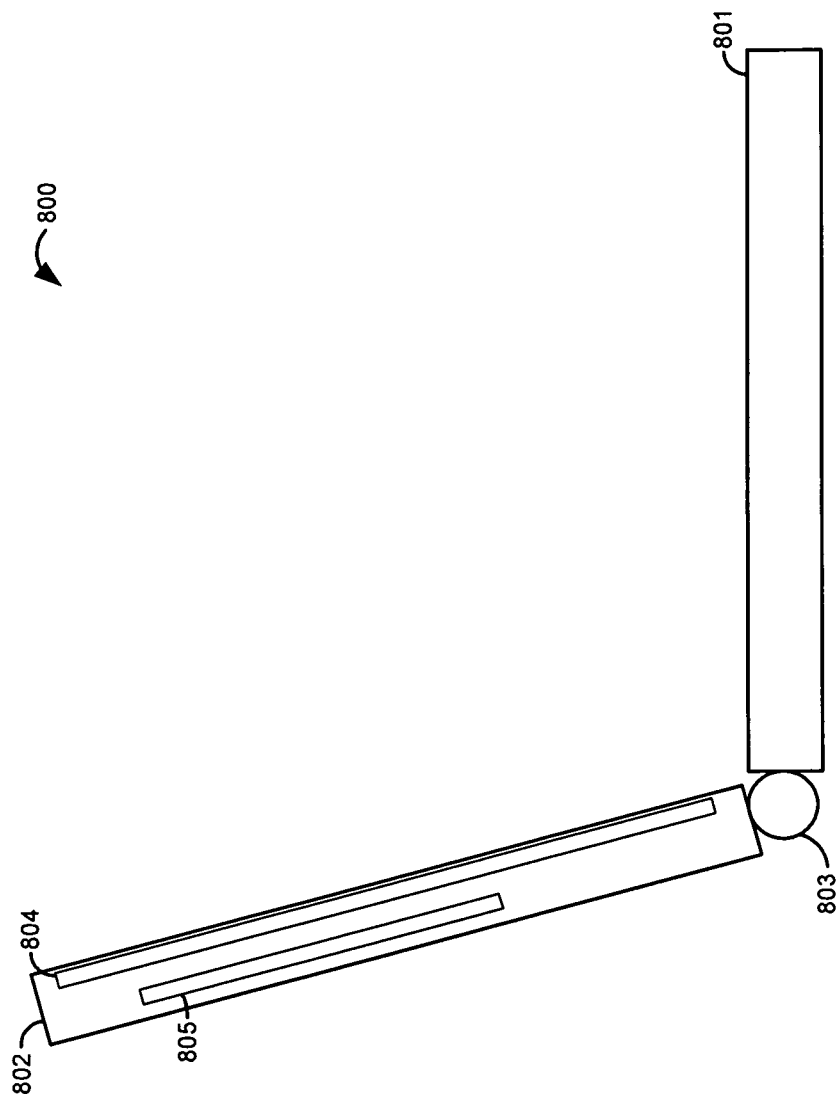

WIRELESS COMMUNICATION DEVICE WITH A MULTI-BAND ANTENNA

TECHNICAL BACKGROUND

A wireless communication device uses an antenna to emit radio frequency signals into the air. In some cases, the wireless communication device uses different frequency bands for different wireless communications, but the device only has single antenna. Unfortunately, the size of the single antenna cannot be optimized for both frequency bands. Thus, wireless communication performance at one or both of the frequency bands is impaired.

The wireless communication device may use a multi-band antenna system with multiple antenna elements that are coupled through an array of switches. Unfortunately, a physically separate switch control network is required to operate the switches and configure the antenna system. This relatively complex antenna control system may not be desirable for smaller devices, such as laptop computers and smart phones.

Overview

In a wireless communication device, circuitry selects a first frequency band for a first wireless communication and transfers a pair of radio frequency signals at the first frequency band. An antenna receives and orthogonally transmits the radio frequency signals over a first patch antenna element that is resonant at the first frequency band. The circuitry selects a second frequency band for a second wireless communication and transfers a pair of radio frequency signals at the second frequency band and including a voltage component. The antenna receives the radio frequency signals including the voltage component and couples a second patch antenna element to the first patch antenna element in response to the voltage component. The antenna orthogonally transmits the radio frequency signals over the coupled patch antenna elements that together are resonant at the second frequency band.

BRIEF DESCRIPTION OF THE DRAWINGS

FIG. 8 illustrates a wireless communication device.

DETAILED DESCRIPTION

Figure 1:
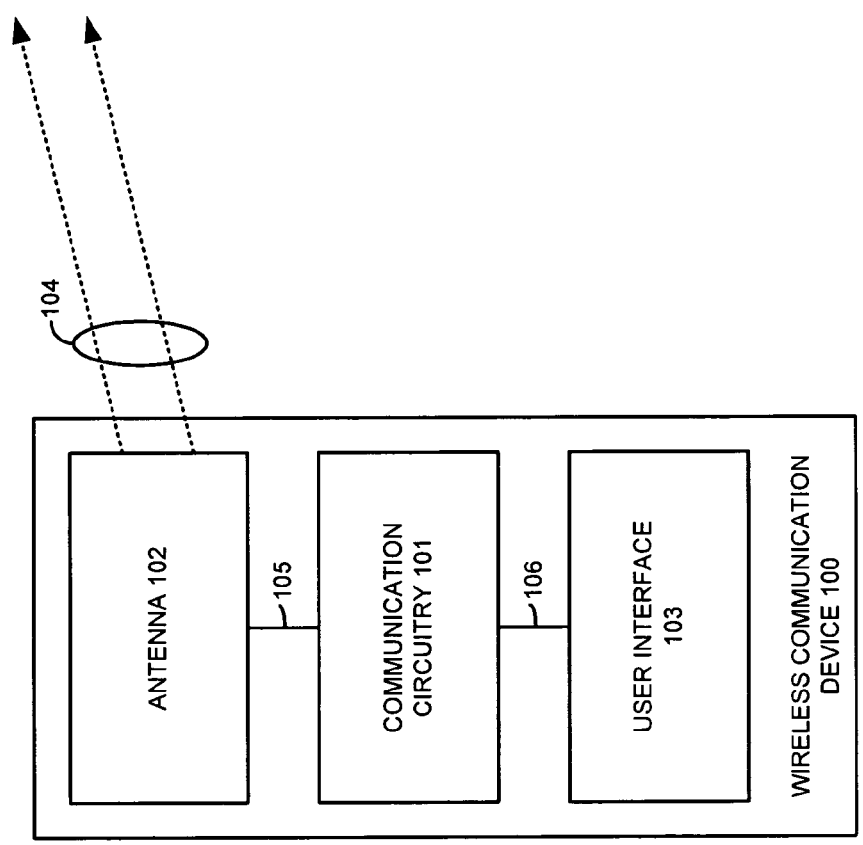
FIG. 1 illustrates a wireless communication device.

FIG. 1 illustrates wireless communication device 100. Wireless communication device 100 comprises communication circuitry 101, multi-band antenna 102, user interface 103, and connections 105-106. Communication circuitry 101 is communicatively linked to multi-band antenna 102 over connection 105. Communication circuitry 101 is communicatively linked to user interface 103 over connection 106. Connections 105-106 each comprise one or more metallic links, although additional non-metallic links with suitable signal conductivity could be used. Antenna 102 wirelessly emits pairs of Radio Frequency (RF) signals 104 in an orthogonal manner. Antenna 102 may receive RF signals as well.

Wireless communication device 100 typically includes other well-known components, such as a battery power supply and a plastic enclosure, that are not shown for the sake of clarity. Wireless communication device 101 may be a telephone, laptop computer, tablet computer, e-book, mobile Internet appliance, or some other wireless communication apparatus—including combinations thereof. Wireless communication signals 104 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), or some other wireless communication format—including combinations thereof. Wireless communication signals 104 may be Multiple Input/Multiple Output (MIMO) signals.

Communication circuitry 101 comprises components that control the operation of wireless communication device 100 responsive to user inputs and received signals. These components may include a memory device, microprocessor and signal processing circuitry, Radio Frequency (RF) modulator, circuitry board and connections, although other types of circuitry could be used. The memory device could be a disk drive, flash drive, integrated circuit, or some other data storage apparatus. The memory device stores software that typically includes an operating system, utilities, and applications. The microprocessor and signal processing circuitry comprise integrated circuitry that retrieves and executes the software to control the operation of wireless communication device 100 as described herein. The RF modulator converts communication signals between RF and lower frequencies, and typically, also filters and amplifies the communication signals. The circuitry board and connections hold and communicatively link the components of communication circuitry 101.

Multi-band antenna 102 comprises at least two patch antenna elements that can be automatically coupled in response to a voltage component. By itself, a first one of the patch antenna elements is resonant at a first frequency band and emits a pair of orthogonal RF signals at the first frequency band. When the first patch antenna element is coupled to one or more additional patch antenna elements, the coupled patch antenna elements are together resonant at a second frequency band and emit another pair of orthogonal RF signals at the second frequency band. A patch antenna is resonant at a frequency band when the antenna element is optimally sized for the wavelength of the frequency band, such as sizing the antenna element at half of the wavelength. The first frequency band and the second frequency band are typically two different frequency bands that support two different protocols such as: CDMA and EVDO, CDMA and WIMAX, CDMA and GSM, CDMA and LTE, CDMA and WIFI, EVDO and WIMAX, EVDO and GSM, EVDO and LTE, EVDO and WIFI, WIMAX and GSM, WIMAX and LTE, WIMAX and WIFI, GSM and LTE, GSM and WIFI, or LTE and WIFI.

User interface 103 comprises components that interact with a user to receive user inputs and to present media and/or information. These components may include a graphic display, speaker, microphone, buttons, lights, touch screen, touch pad, scroll wheel, and media ports, although other types of user input/output devices could be used. User interface 103 could be omitted in some examples.

Figure 2:
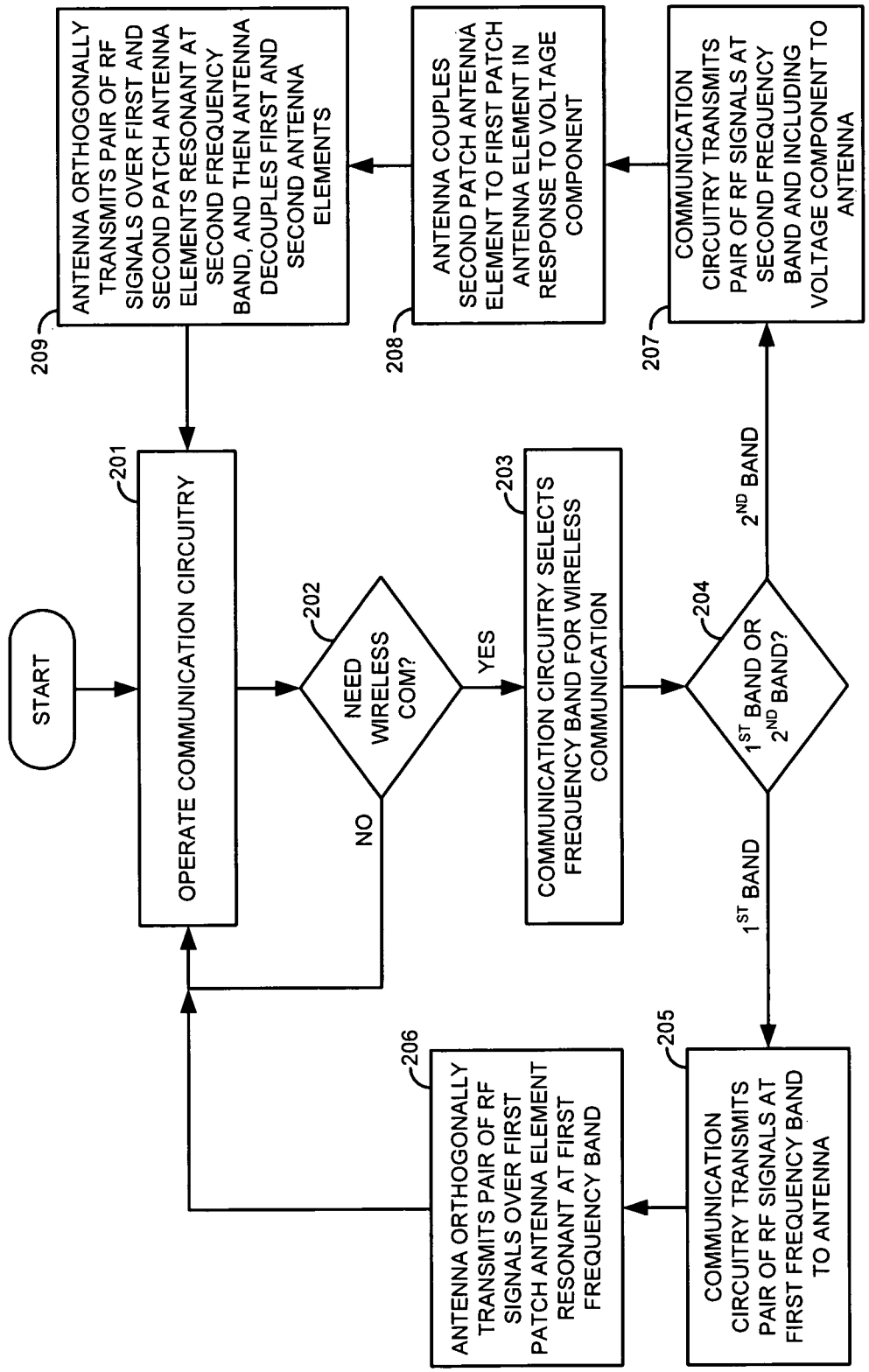
FIG. 2 illustrates the operation of the wireless communication device.

FIG. 2 illustrates the operation of wireless communication device 100. The operation of device 100 begins when communication circuitry 101 is activated (201) and the need for a wireless communication is determined (202). When the need for the wireless communication is determined (202), communication circuitry 101 selects a frequency band for the wireless communication (203)—possibly in response to a user input that indicates the selected frequency band or in response to an RF scan that detects an available frequency band.

If a first frequency band is selected (204), then communication circuitry 101 transmits a pair of RF signals at the first frequency band to antenna 102 over connection 105 (205). Antenna 102 orthogonally transmits the pair of RF signals at the first frequency band over a first patch antenna element that is resonant at the first frequency band (206). Thus, the first patch antenna element wirelessly emits the pair of RF signals in an orthogonal manner at the first frequency band.

If a second frequency band is selected (204), then communication circuitry 101 transmits a pair of RF signals at the second frequency band and including a voltage component to antenna 102 over connection 105 (207). In response to the voltage component, antenna 102 couples the first patch antenna element to at least a second patch antenna element where the coupled antenna elements are resonant at the second frequency band (208). Antenna 102 orthogonally transmits the pair of RF signals at the second frequency band over the coupled patch antenna elements that are resonant at the second frequency band (209). Thus, the coupled patch antenna elements wirelessly emit the pair of RF signals in an orthogonal manner at the second frequency band.

Note that communication circuitry 101 can transfer one of the RF signals and the voltage component to multi-band antenna 102 over the same physical connection 105. If connection 105 comprises multiple metallic links, then at least one of the RF signals shares at least one of the metallic links with the voltage component. A physically separate switch control network is avoided. In some examples, two metallic links are used for two respective RF signals, and the voltage component shares one or both of the metallic links with the RF signals. Time or frequency division multiplexing could be used to combine and separate the RF signal and the voltage component on connection 105. Thus, an efficient multi-band antenna control arrangement is provided for laptop computers, smart phones, and other wireless communication devices.

Figure 3:
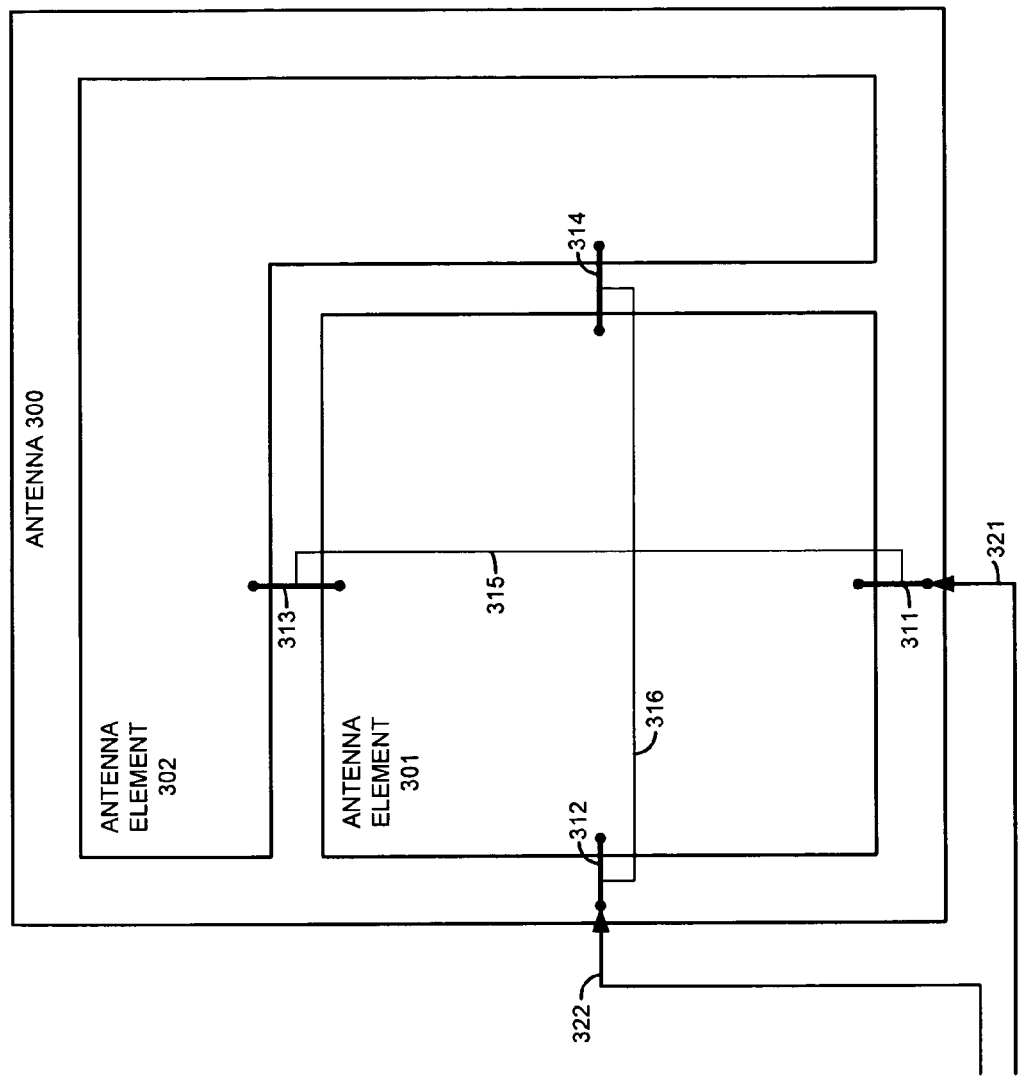
FIG. 3 illustrates a multi-band antenna.

FIG. 3 illustrates multi-band antenna 300. Antenna 300 provides an example of antenna 102 described above, although other antenna configurations could be used for antenna 102 in wireless communication device 100. Antenna 300 comprises antenna elements 301-302, input circuits 311-312, diode switches 313-314, and voltage links 315-316. Antenna element 301 is a square metal plate, and antenna element 302 is an L-shaped metal plate. By itself, antenna element 301 is resonant at a first frequency band. When coupled by diode switches 313-314, antenna elements 301-302 are together resonant at a second frequency band. Antenna 300 includes a ground plate underneath antenna elements 301-302 which is not shown for clarity. The ground plate is typically positioned in parallel to antenna elements 301-302, and is separated from antenna elements 301-302 by a dielectric.

Input circuits 311-312 receive respective RF signals 321-322. If RF signals 321-322 include a DC voltage that exceeds a threshold, then input circuits 311-312 transfer the DC voltage to respective diode switches 313-314 over voltage links 315-316. The DC voltage will forward bias diode switches 313-314 to electrically couple antenna elements 301-302 for the orthogonal propagation of RF signals 321-322 over both antenna elements 301-302. If RF signals 321-322 do not include a DC voltage level that exceeds the threshold, then diode switches 313-314 remain reverse biased and antenna elements 301-302 remain uncoupled for the orthogonal propagation of RF signals 321-322 over only antenna element 301. RF signals 321-322 could be MIMO signals that are configured for orthogonal propagation. RF signals 321-322 could support various protocols, such as CDMA, EVDO, WIMAX, GSM, LTE, WIFI, or some other wireless communication format.

Figure 4:
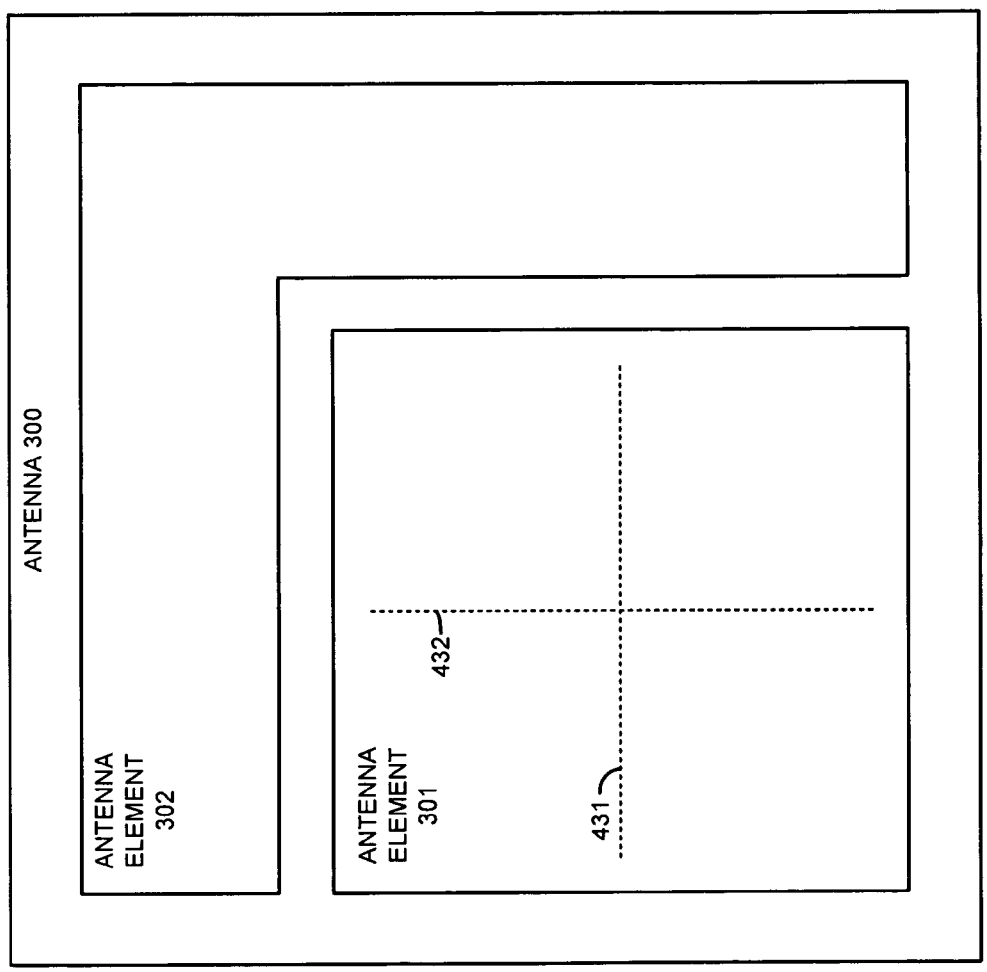
FIG. 4 further illustrates the multi-band antenna.

FIG. 4 illustrates antenna 300 with antenna elements 301-302 uncoupled. Dashed lines 431-432 represent the orthogonal propagation of RF signals over only antenna element 301.

Figure 5:
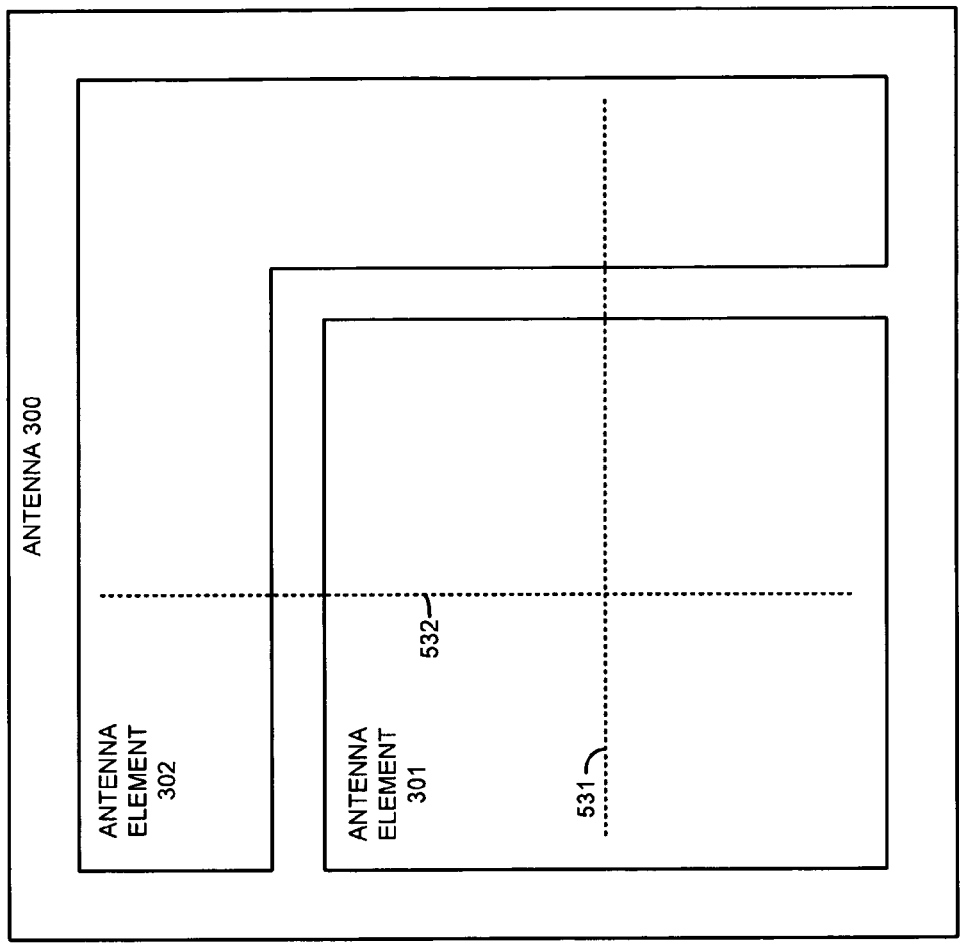
FIG. 5 further illustrates the multi-band antenna.

FIG. 5 illustrates antenna 300 with antenna elements 301-302 electrically coupled. Dashed lines 531-532 represent the orthogonal propagation of RF signals over both antenna elements 301-302.

Figure 6:
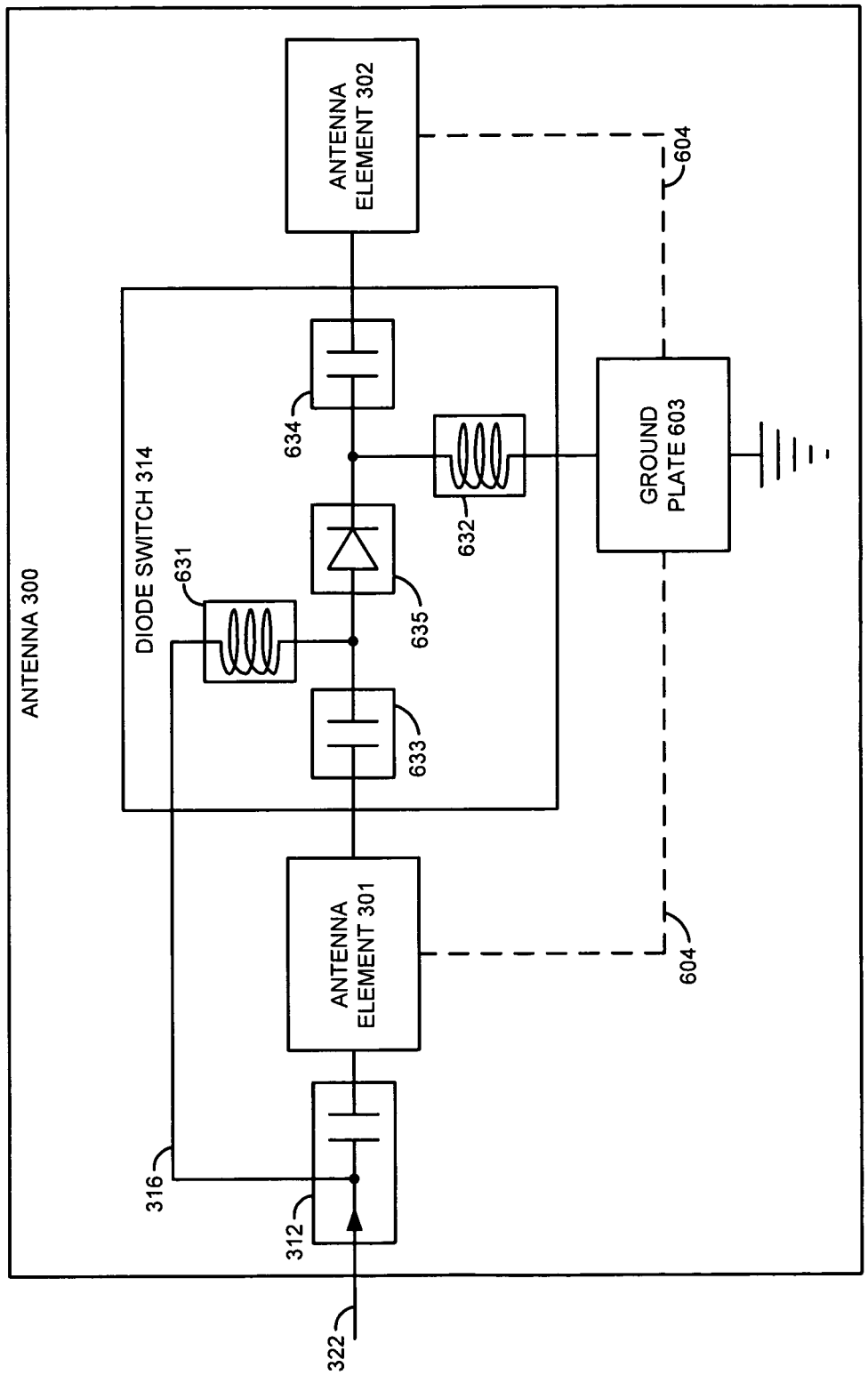
FIG. 6 further illustrates the multi-band antenna.

FIG. 6 illustrates input circuit 312 and diode switch 314 of antenna 300. Antenna 300 is now shown with ground plate 603. Dashed lines 604 represent the dielectric that propagates RF signals from antenna elements 301-302 to ground plate 603.

Input circuit 312 includes a capacitor to inhibit DC voltage from reaching antenna element 301 while passing RF signal 322 to antenna element 301. Input circuit 312 allows any DC voltage included with RF signal 322 to propagate to diode switch 314 over voltage link 316.

Diode switch 314 comprises inductors 631-632, capacitors 633-634, and diode 635. Inductor 631 inhibits RF signals from diode switch 314 from reaching voltage link 316 while allowing DC voltage from link 316 to reach and forward bias diode 635. Inductor 632 inhibits RF signals from reaching ground plate 603 while allowing DC voltage that is forward biasing diode 635 to reach ground plate 603. Capacitor 633 passes RF signals from antenna element 301 to diode 635 while inhibiting DC voltage from reaching antenna element 301. Capacitor 634 passes RF signals from diode 635 to antenna element 302 while inhibiting DC voltage from reaching antenna element 302. Diode 635 passes RF signals from capacitor 633 to capacitor 634 when forward biased by the DC voltage. Diode 635 does not pass RF signals from capacitor 633 to capacitor 634 when it is not forward biased.

Figure 7:
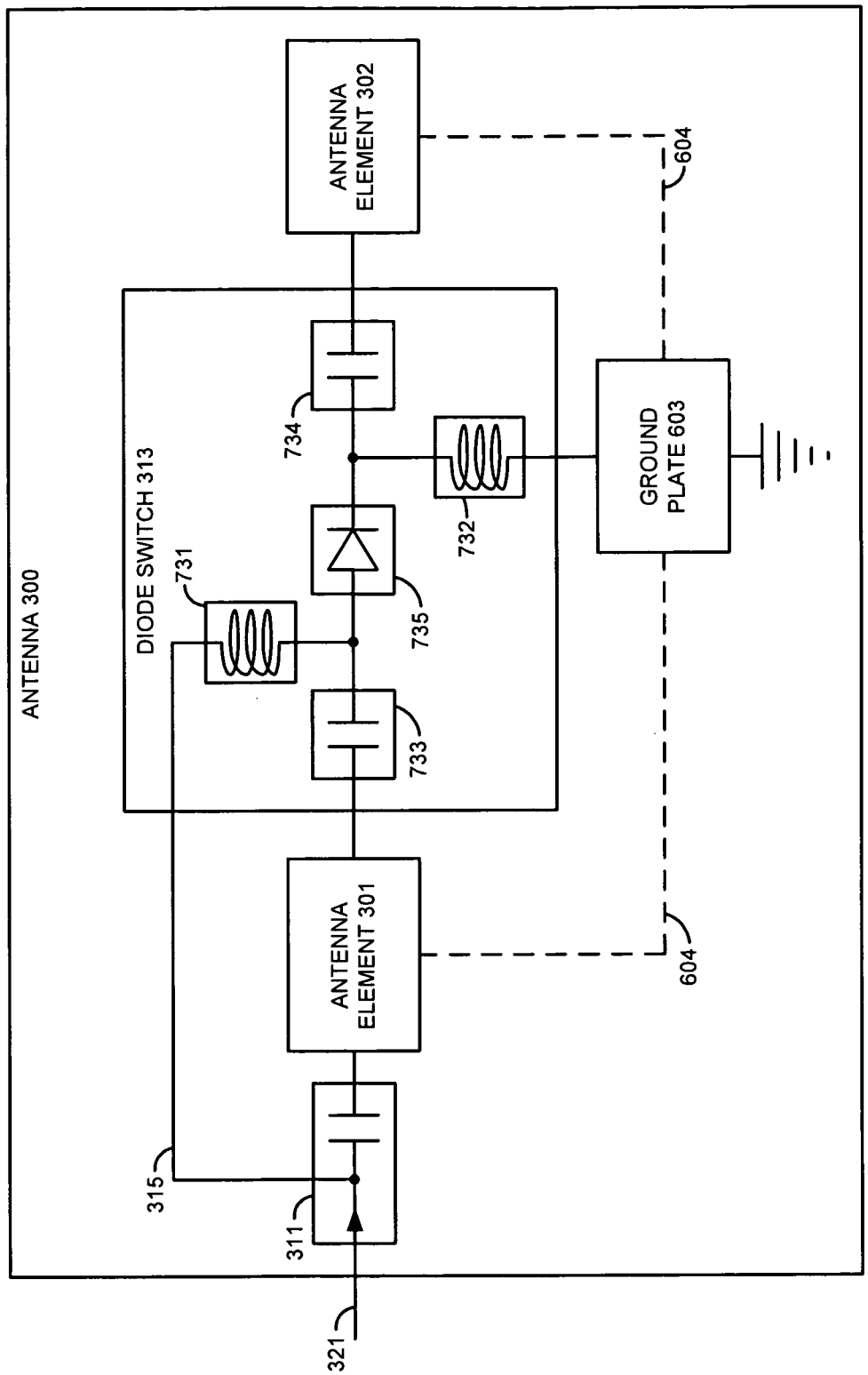
FIG. 7 further illustrates the multi-band antenna.

FIG. 7 illustrates input circuit 311 and diode switch 313 of antenna 300. Antenna 300 is shown with ground plate 603. Dashed lines 604 represent the dielectric that propagates RF signals from antenna elements 301-302 to ground plate 603.

Input circuit 311 includes a capacitor to inhibit DC voltage from reaching antenna element 301 while passing RF signal 321 to antenna element 301. Input circuit 311 allows any DC voltage included with RF signal 321 to propagate to diode switch 313 over voltage link 315.

Diode switch 313 comprises inductors 731-732, capacitors 733-734, and diode 735. Inductor 731 inhibits RF signals from diode switch 313 from reaching voltage link 315 while allowing DC voltage from link 315 to reach and forward bias diode 735. Inductor 732 inhibits RF signals from reaching ground plate 603 while allowing DC voltage that is forward biasing diode 735 to reach ground plate 603. Capacitor 733 passes RF signals from antenna element 301 to diode 735 while inhibiting DC voltage from reaching antenna element 301. Capacitor 734 passes RF signals from diode 735 to antenna element 302 while inhibiting DC voltage from reaching antenna element 302. Diode 735 passes RF signals from capacitor 733 to capacitor 734 when forward biased by the DC voltage. Diode 735 does not pass RF signals from capacitor 733 to capacitor 734 if it is not forward biased.

Note that input circuit 311 is able to receive RF signal 321 and its DC voltage component over the same physical connection. Also note that input circuit 312 is able to receive RF signal 322 and its DC voltage component over the same physical connection. This arrangement avoids a physically separate switch control network and adds significant efficiency to multi-band antenna control in wireless communication devices.

There are many alternative configurations to antenna 300 that are suitable for wireless communication device 100. For example, antenna element 302 may be comprised of two plates instead of a single plate. In another example, additional antenna elements could be coupled by additional DC voltages and diode switches. In another example, one of voltage links 315-316 could be omitted and the other link could be used to bias both diode switches 313-314. In another example, input circuits 311-312, voltage links 315-315, inductors 631 and 731, and capacitors 633 and 733 could be omitted to allow the DC voltage to propagate over antenna element 301 to diodes 635 and 735. In addition, the location and/or the number of input circuits and diode switches could be varied.

FIG. 8 illustrates wireless communication device 800. Communication device 800 could be a laptop computer, tablet computer, e-book, mobile internet appliance, smart phone, or some other apparatus with RF communication capability. Communication device 800 includes lower portion 801, upper portion 802, and middle portion 803. Lower portion 801 houses communication circuitry and user interfaces that are configured and operate as described above for device 100. Upper portion 802 houses graphical display 804 and multi-band antenna 805. Multi-band antenna 805 is configured and operates as described above for device 100. Note that graphical display 804 and multi-band antenna 805 are arranged in parallel. Middle portion 803 allows lower portion 801 and upper portion 802 to be folded together. Portions 801-803 may include other components, such as communication ports, keys, microprocessors, and memory devices to name a few examples. In addition, middle portion 803 could be omitted, and portions 801-802 could be integrated together.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device comprising:
   communication circuitry configured to select a first frequency band for a first wireless communication and transfer a first pair of radio frequency signals at the first frequency band;
   an antenna configured to receive and orthogonally transmit the first pair of radio frequency signals over a first patch antenna element that is resonant at the first frequency band;
   the communication circuitry further configured to select a second frequency band for a second wireless communication and transfer a second pair of radio frequency signals at the second frequency band and including a Direct Current (DC) voltage component, wherein the second pair of radio frequency signals and the DC voltage component are transferred over the same physical connection to an input circuit of the antenna; and
   the antenna further configured to receive, over the input circuit of the antenna, the second pair of radio frequency signals including the DC voltage component, couple a second patch antenna element to the first patch antenna element in response to the DC voltage component, and orthogonally transmit the second pair of radio frequency signals over the coupled patch antenna elements that together are resonant at the second frequency band.

2. The wireless communication device of claim 1 wherein the first patch antenna element comprises a square metal plate.

3. The wireless communication device of claim 2 wherein the second patch antenna element comprises an L-shaped metal plate.

4. The wireless communication device of claim 3 wherein the antenna comprises a ground plate.

5. The wireless communication device of claim 1 wherein the antenna comprises a first diode switch that couples the first patch antenna element to the second patch antenna element in response to the DC voltage.

6. The wireless communication device of claim 5 wherein the antenna comprises a second diode switch that couples the first antenna element to the second antenna element in response to the DC voltage.

7. The wireless communication device of claim 1 further comprising a display screen that is positioned in parallel to the first patch antenna element.

8. The wireless communication device of claim 7 wherein the device comprises a computer.

9. The wireless communication device of claim 8 wherein the device comprises a mobile internet appliance.

10. The wireless communication device of claim 8 wherein the device comprises a smart phone.

11. The wireless communication device of claim 1 wherein the first frequency band and the second frequency band support CDMA and EVDO.

12. The wireless communication device of claim 1 wherein the first frequency band and the second frequency band support EVDO and WIMAX.

13. The wireless communication device of claim 1 wherein the first frequency band and the second frequency band support EVDO and LTE.

14. The wireless communication device of claim 1 wherein the first frequency band and the second frequency band support GSM and EVDO.

15. The wireless communication device of claim 1 wherein the first frequency band and the second frequency band support GSM and LTE.

16. The wireless communication device of claim 1 wherein the first frequency band and the second frequency band support GSM and WIFI.

17. The wireless communication device of claim 1 wherein the first frequency band and the second frequency band support WIFI and WIMAX.

18. The wireless communication device of claim 1 wherein the first frequency band and the second frequency band support WIFI and LTE.

19. The wireless communication device of claim 1 wherein the first frequency band and the second frequency band support WIFI and EVDO.

* * * * *